United States Patent
Vigoureux et al.

(10) Patent No.: US 7,664,029 B2
(45) Date of Patent: Feb. 16, 2010

(54) METHOD OF DETERMINING A SPECTRAL ROUTE FOR A GIVEN CONNECTION IN AN OPTICAL TELECOMMUNICATIONS NETWORK

(75) Inventors: Martin Vigoureux, Paris (FR); Richard Douville, Bretigny sur Orge (FR); Emmanuel Dotaro, Verrieres le Buisson (FR); Laurent Ciavaglia, Paris (FR)

(73) Assignee: Alcatel, Paris (FR)

( * ) Notice: Subject to any disclaimer, the term of this patent is extended or adjusted under 35 U.S.C. 154(b) by 552 days.

(21) Appl. No.: 10/505,214

(22) PCT Filed: Feb. 21, 2002

(86) PCT No.: PCT/FR02/00652

§ 371 (c)(1),
(2), (4) Date: Oct. 26, 2004

(87) PCT Pub. No.: WO03/079596

PCT Pub. Date: Sep. 25, 2003

(65) Prior Publication Data

US 2005/0069316 A1    Mar. 31, 2005

(51) Int. Cl.
*H04J 1/16*        (2006.01)
*H04L 12/66*       (2006.01)
*H04L 12/28*       (2006.01)
*H04J 14/00*       (2006.01)

(52) U.S. Cl. ............... 370/235; 370/248; 370/253; 370/356; 370/400; 396/49; 396/57

(58) Field of Classification Search ............ None
See application file for complete search history.

(56) References Cited

U.S. PATENT DOCUMENTS

| | | | |
|---|---|---|---|
| 5,541,756 A * | 7/1996 | Chang-Hasnain et al. | 398/51 |
| 6,205,117 B1 * | 3/2001 | Doshi et al. | 370/228 |
| 6,584,071 B1 * | 6/2003 | Kodialam et al. | 370/238 |
| 6,594,268 B1 * | 7/2003 | Aukia et al. | 370/400 |
| 6,842,463 B1 * | 1/2005 | Drwiega et al. | 370/468 |
| 6,982,951 B2 * | 1/2006 | Doverspike et al. | 370/217 |
| 7,031,299 B2 * | 4/2006 | Chaudhuri et al. | 370/352 |

(Continued)

FOREIGN PATENT DOCUMENTS

WO    WO 99/46951    9/1999

OTHER PUBLICATIONS

J. Strand et al, "Importance of wavelength conversion in an optical network", Optical Networks Magazine, May-Jun. 2001, Netherlands, vol. 2, No. 3, pop. 33-44, XP001106483.

(Continued)

*Primary Examiner*—Melanie Jagannathan
(74) *Attorney, Agent, or Firm*—Sughrue Mion, PLLC

(57) ABSTRACT

In order to determine a spectral route for a given connection in an optical telecommunications network (T) between a starting node (ON1) and a destination node (ON6) of the network, the method consists in: using a conventional routing method to determine one or more candidate spatial routes (Route i, Route 2) connecting the starting node (ON1) to the destination node (ON6), each candidate spatial route comprising a sequence of route segments, each segment connecting two nodes of the network directly and being adapted to support a plurality of spectral routes.

17 Claims, 2 Drawing Sheets

U.S. PATENT DOCUMENTS

| | | |
|---|---|---|
| 7,039,009 B2 | 5/2006 | Chaudhuri et al. |
| 7,096,176 B1 * | 8/2006 | Hess .......................... 703/21 |
| 7,167,443 B1 * | 1/2007 | Dantu et al. ................ 370/218 |
| 7,215,640 B2 | 5/2007 | Matsubara |
| 7,263,100 B2 * | 8/2007 | Hauser et al. .......... 370/395.41 |
| 2003/0198227 A1 | 10/2003 | Matsuura et al. |

OTHER PUBLICATIONS

P. Ashwood-Smith et al, "Generalized MPLS-Signaling Functional Description", Network Working Group, Internet Draft, Nov. 2001, pp. 1-27, XP002216341.

* cited by examiner

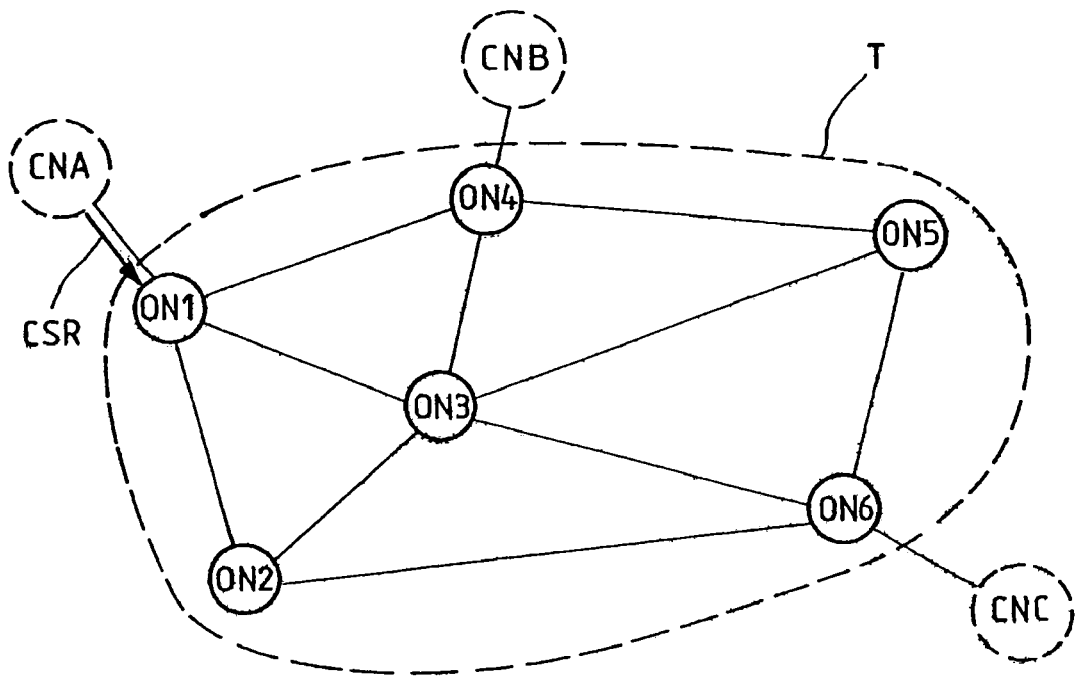
FIG_1
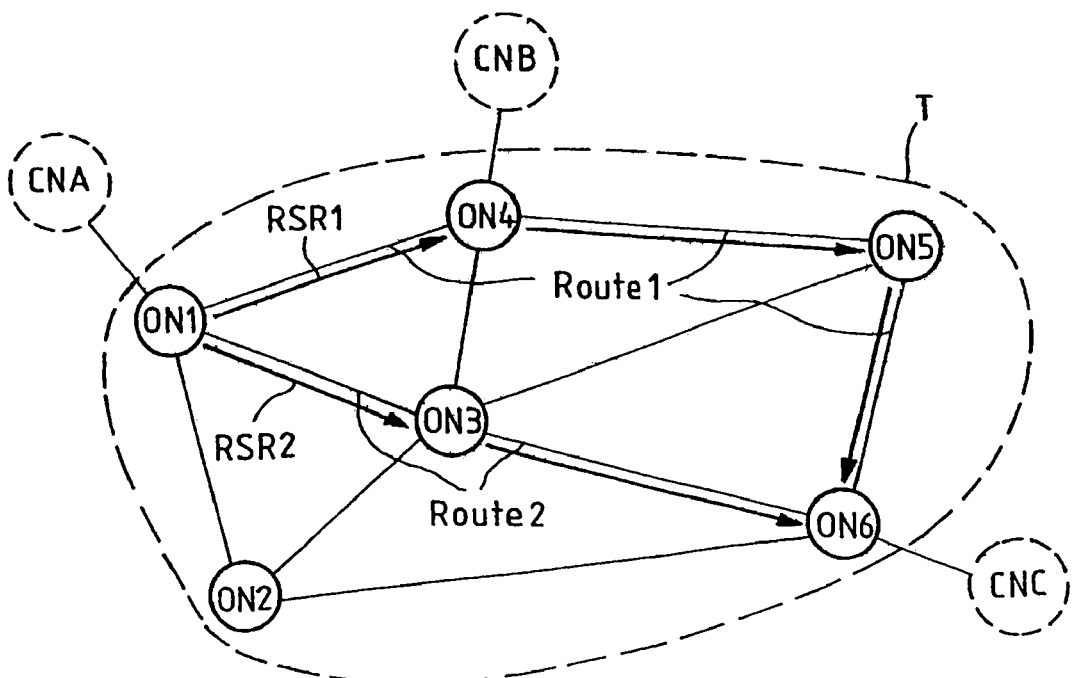
FIG_2

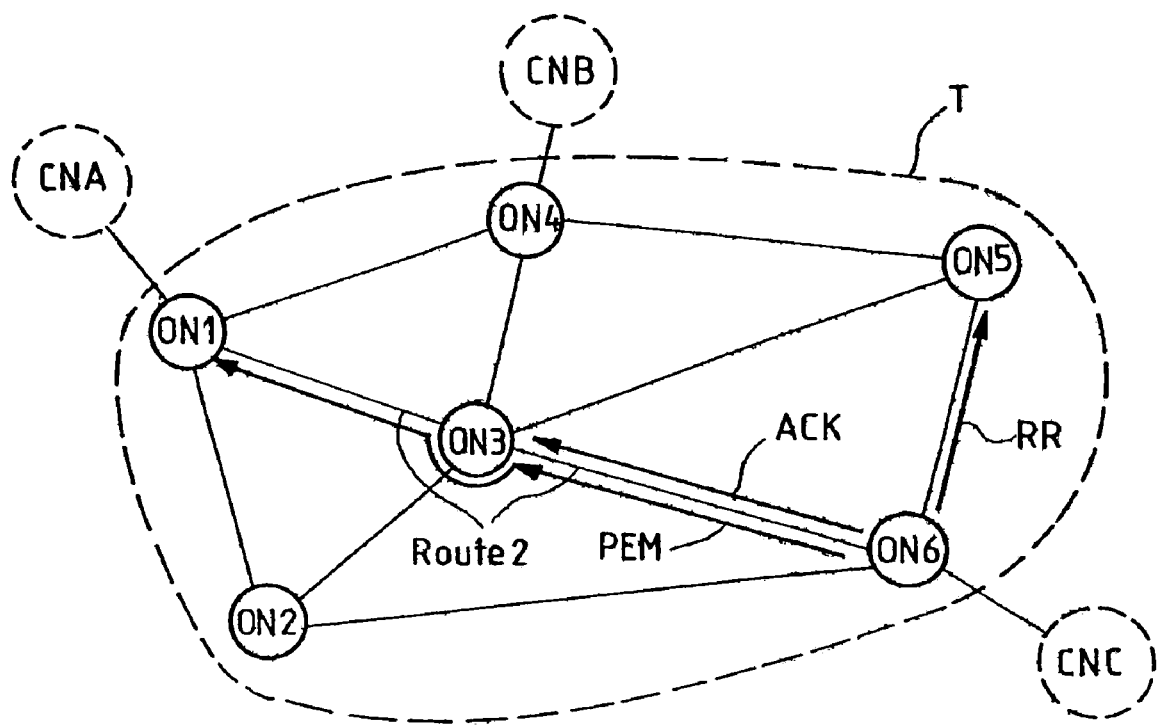
FIG_3

METHOD OF DETERMINING A SPECTRAL ROUTE FOR A GIVEN CONNECTION IN AN OPTICAL TELECOMMUNICATIONS NETWORK

FIELD OF THE INVENTION

The invention relates to a method of determining a spectral route for a given connection in an optical telecommunications network, and it also relates to a node for implementing the method. It relates more particularly to wavelength division multiplex (WDM) optical networks that use a plurality of wavelengths to transmit a plurality of data streams simultaneously on the same optical fibre.

BACKGROUND OF THE INVENTION

To set up a connection in this kind of network, it is necessary to determine not only a spatial route, consisting of a sequence of route segments connecting the starting node to the destination node, but also a spectral route, since each segment is able to support a plurality of wavelengths each constituting a spectral route segment. Selecting a spectral route entails selecting the wavelength to be used, or the wavelengths to be used successively, on different segments along the spatial route. It is sometimes necessary to carry out operations on the signal and/or the information transported, necessitating the addition of dedicated equipment to the network and the use thereof. However, such processing operations are costly, and it is therefore desirable to avoid them as much as possible. They may relate to regeneration and/or wavelength conversion, which may be carried out by purely optical means or using optical-electrical and electrical-optical conversion means.

The expression "wavelength continuity" refers to the use of the same wavelength from the starting node to the destination node, even if operations on the signal and/or the information transported require optical-electronic-optical conversion or 1R, 2R, or 3R regeneration.

The term "transparency" is used, a distinction being drawn between different types of transparency, depending on whether optical-electronic-optical conversion, wavelength conversion, 1R, 2R or 3R regeneration, or a combination of these operations are avoided. The aim is to avoid the route for the signal passing through "non-transparency points" or, if this is not possible, to minimize the number of non-transparency points the signal passes through. For example, in the case of a form of transparency consisting in the absence of optical-electronic-optical conversion, the aim is to minimize the number of times the optical signal passes through opto-electronic and electronic-optical interfaces. If it is not possible to avoid conversion completely, then a route is looked for that minimizes the number of conversions needed.

There may additionally be connection capacity constraints or quality-of-service constraints that influence the selection of the spatial route and the spectral route.

At present, there is no satisfactory method of determining a transparent route of the above kind. One method was proposed to the IETF in Generalized MPLS—Signaling Functional Description, chapters 3.4 and 3.5, Expiration date: November 2001, Network Working Group, Internet Draft.

That prior art method consists in:

using a conventional routing method to determine a spatial route connecting a starting node to a destination node and comprising a sequence of route segments, each segment interconnecting two nodes of the network directly;

determining a first set of wavelengths, in the starting node, for communicating with the next node constituting the route, i.e. the second node on the route;

determining, from the set of wavelengths proposed by the preceding node, a second set of wavelengths, in the second node, for communicating with the next node constituting the route, i.e. the third node on the route;

in the $n^{th}$ node, determining, from the set of wavelengths proposed by the preceding node, an $(n+1)^{th}$ set of wavelengths, for communicating with the next node constituting the route, i.e. the $(n+1)^{th}$ node on the route; and so on, as far as the destination node.

The object of the above prior art method is only to assure wavelength continuity. The nodes do not propagate the sets of wavelengths because they do not need to do this to find a spectral route assuring wavelength continuity (should one exist end to end).

Each node of the route may retain or reduce the set of wavelengths that it inherits from the upstream node, according to the resources available for the connection to the downstream node. A transparent route is finally set up if the resulting set contains at least one wavelength. A drawback of that method is a high probability of blocking, since the selection made locally at each node may reduce options in downstream nodes. That method therefore constitutes a sub-optimum solution, or even no solution at all in some cases, when there is in fact an acceptable solution, although it is not transparent end to end. Also, the above prior art method takes account of only one parameter: the continuity of a given wavelength.

SUMMARY OF THE INVENTION

The object of the invention is to propose a method that does not have the above drawbacks.

The invention consists in a method of determining a spectral route in an optical telecommunications network between a starting node and a destination node of the network, the method being characterized in that it consists in:

using a conventional routing method to determine at least one candidate spatial route connecting the starting node to the destination node, each candidate spatial route consisting of a sequence of route segments, each segment connecting two nodes of the network directly and being adapted to support a plurality of wavelengths each constituting a spectral route segment;

collecting values of parameters characterizing all the spectral route segments along each candidate spatial route; and finally, using ah optimization method to process all the collected parameter values to select a spectral route and the spatial route that supports it by selecting the wavelength to be used, or the wavelengths to be used successively, to connect the starting node to the destination node.

The above method has the advantage of reducing the probability of blocking resulting from the impossibility of finding a route, since it provides, at any given time, knowledge of the parameter values for all the segments constituting one or more candidate routes (especially transparency parameter values). This complete knowledge is used to select more efficiently a transparent route or a route comprising a minimum number of non-transparency points. This overview leads to real optimization, i.e. avoiding possible solutions being abandoned during the process.

In a preferred embodiment, to collect parameter values characterizing all route segments along each candidate spatial route, a route set-up request message is sent from the starting node to the destination node and parameter values are collected in the message as it passes through each node along the candidate spatial route.

It should be observed that, in order to maximize the chances of finding a transparent route, this method may be applied several times simultaneously on separate spatial routes to satisfy the same connection set up request.

A preferred embodiment of the method of the invention is implemented in the node at the end of the route whose setting up has been requested, which is called the destination node.

The method of the invention uses the signaling means of the network to transmit transparency parameter values, providing up-to-date values for each new route set up request.

These parameter values do not relate only to wavelengths, and may relate to all other physical parameters of the connections between the nodes of the network.

In one embodiment, the parameters characterizing all the spectral route segments along each candidate spatial route take account of transparency constraints.

In one embodiment, the parameters characterizing all the spectral route segments along each candidate spatial route take account of connection capacity constraints.

In one embodiment, the parameters characterizing all the spectral route segments along each candidate spatial route take account of quality of service constraints.

The invention also provides an optical network node for implementing a method according to the invention, the node being characterized in that it comprises management means for:
  receiving a route set-up request message on a predetermined spatial route passing through the node;
  adding to the content of the message parameter values concerning spectral routes supported by the spatial route segment immediately upstream and/or downstream of the node on the spatial route, together with parameter values concerning the interfaces of the node; and
  forwarding the message modified in this way to another node situated on the spatial route segment immediately downstream of the node and designated by routing information contained in the message.

BRIEF SUMMARY OF THE DRAWINGS

The invention will be better understood and other features will become apparent in the light of the following description and the accompanying drawings, in which:

FIG. 1 shows one example of an optical network in which the method of the invention may be used;

FIG. 2 shows the execution of a first portion of the method of the invention in the network example represented in FIG. 1; and FIG. 3 shows the execution of a second portion of the method of the invention in the network example represented in FIG. 1.

The network T shown by way of example in FIG. 1 comprises optical nodes ON1 to ON6 interconnected by bidirectional or unidirectional connections:
  ON1-ON2
  ON1-ON3
  ON1-ON4
  ON2-ON6
  ON3-ON5
  ON3-ON6

In this example, the network T interconnects three client networks CNA, CNB, CNC which are connected to nodes ON1, ON4, ON6, respectively, at the edge of the network T. The method of the invention is executed in the network T and is totally independent of the number and nature of the client networks.

DETAILED DESCRIPTION OF THE INVENTION

In one implementation of the method of the invention, a connection set-up request CSR is sent by the client network CNA to the management means of the node ON1 in order to set up a connection between the client networks CNA and CNC. The request contains the identity of the requesting client network CNA and the identity of the requested client network CNC and indicates constraints on transparency, capacity, quality of service, etc. The network T must determine a transparent route or, if this is not possible, a route comprising as few points of non-transparency as possible but still conforming to the capacity and quality of service constraints set for the connection. The optical transparency parameter constraints may be values of wavelength, spectral spacing, tolerance of non-linear effects (four-wave mixing, etc.), the obligatory absence of regeneration, etc.

FIG. 2 shows a first portion of this embodiment of the method of the invention. The management means of the node ON1 translate the connection set-up request CSR into a route set-up request RSR, i.e. translate constraints referred to in the connection request into constraints relating to routing.

Using a conventional routing method, the management means determine one or more spatial routes, referred to as candidate routes, connecting the client network CNA to the client network CNC, as a function of the topology and the connectivity of the network T. For example, they find two candidate spatial routes, Route 1 and Route 2, which are valid because they satisfy all the routing constraints referred to in the original connection set-up request CSR.

Route 1=ON1, ON4, ON5, ON6

Route 2=ON1, ON3, ON6

The management means of the node ON1 then forward the route set-up request RSR to the node ON6, and two copies RSR1 and RSR2 of the request are routed simultaneously on the two routes Route 1 and Route 2. The routing along these two routes is controlled by the management means of the starting node ON1 on furnishing the request to the signaling means of the network T. The copy RSR1 passes first through the node ON4 on the route Route 1 and the copy RSR2 passes through the node ON3 on the route Route 2.

Each node ON1, ON4, ON5 through which the route set-up request RSR1 passes adds to the content of the request parameter values relating to the route segment immediately upstream and/or downstream of the node on the spatial route concerned, together with parameter values concerning the interfaces of the node, these values corresponding to parameters referred to in the request, in particular optical transparency parameters. Each node ON1, ON3 through which the route set-up request RSR2 passes performs the same action on the request RSR2. the link between ON3 and ON6. These parameter values may equally relate to the downstream connection and the upstream connection of the node. Finally, the two copies RSR1 and RSR2 of the route set-up request reach the destination node ON6.

In a first embodiment, the data collected in these two copies is processed by the management means of the destination node ON6 to determine an optimum combination of spectral route segments between the nodes ON1 and ON6 along each of the spatial routes taken by the connection requests. This data is processed using an optimization algorithm that minimizes a cost function taking into account all the parameter values collected. This algorithm may employ a shortest path algorithm such as the Dijkstra algorithm.

If at least one transparent route is possible, the optimization algorithm finds a transparent route. If no transparent route is possible, the optimization algorithm determines a route comprising the fewest possible points of non-transparency, i.e. an optimum combination of transparent sub-paths.

FIG. 3 represents a second portion of the method of the invention. After determining the optimum spectral route in the manner described above, the destination node ON6 sends a route establishment message PEM to the starting node ON1 and a route set-up request received acknowledgement message ACK to the next node on the spatial route that supports the selected spectral route (Route 2), which is the node ON3 in this example. This message contains a list of the nodes constituting the route that has been determined, and in this example Route 2 is made up of the nodes ON1-ON3-ON6.

The destination node ON6 sends a route release message RR to all the other immediately adjacent nodes along spatial routes that have not been adopted, in this instance Route 1. In this example, the route release message RR is sent to the node ON5, which forwards it in the direction of the node that was the source of the route set-up request (node ON1).

If the algorithm concludes that no route is possible (even a non-transparent route), the destination node ON6 sends a route release message to all of the nodes on the routes Route 1 and Route 2, i.e. the nodes ON1, ON3, ON4, ON5.

In a second embodiment, the two copies RSR1 and RSR2 of the route set-up request (containing all the data collected) are not processed in the destination node ON6, but are returned from the destination node ON6 to the starting node ON1, or to a central unit somewhere in the network T, to be processed there. If the algorithm concludes that no route is possible (even a non-transparent route), the node ON1, respectively the central unit, sends a route release message to all of the nodes situated along the routes Route 1 and Route 2, i.e. the nodes ON1, ON3, ON4, ON5.

The first embodiment has the advantage that it avoids forwarding all of the data collected to the starting node or a central processing unit. This avoids occupying network resources for such forwarding.

The invention claimed is:

1. A method of determining a spectral route in an optical telecommunications network between a starting node and a destination node of the network, the method comprising:
   determining at least one candidate spatial route to connect the starting node to the destination node via network nodes disposed intermediate between the starting node and the destination node, the candidate spatial route consisting of a sequence of spatial route segments, each spatial route segment connecting two nodes of the network directly and being adapted to support a plurality of wavelengths, each wavelength constituting a spectral route segment;
   sending a route set-up request message from the starting node to the destination node via the candidate spatial route;
   collecting values of parameters characterizing the spectral route segments, which values of the parameters include values of optical transparency parameters, in the message as the message traverses the candidate spatial route;
   receiving the message with the collected parameters values in the destination node; and
   using an optimization method to process the collected parameters values in the destination node upon receipt of the message to select the spectral route and the spatial route that supports the selected spectral route by selecting the wavelength to be used, or the wavelengths to be used successively, to spectrally connect the starting node to the destination node.

2. The method according to claim 1, wherein the parameters characterizing all of the spectral route segments along each candidate spatial route take account of transparency constraints.

3. The method according to claim 1, wherein the parameters characterizing all of the spectral route segments along each candidate spatial route take account of connection capacity constraints.

4. The method according to claim 1, wherein the parameters characterizing all of the spectral route segments along each candidate spatial route take account of quality of service constraints.

5. An optical network node for implementing the method according to claim 1, comprising management means for:
   receiving a route set-up request message on a predetermined spatial route passing through the node;
   adding to the content of the message parameter values concerning spectral routes supported by the spatial route segment immediately one of upstream and downstream of the node on the spatial route, together with parameter values concerning interfaces of the node; and
   forwarding the message modified in this way to another node situated on the spatial route segment immediately downstream of the node and designated by routing information contained in the message.

6. The optical network node according to claim 5, wherein the method further comprises:
   determining sets of wavelengths available for a connection from the optical network node to a downstream node along the spatial route segments, wherein the values of the collected parameters include identifications of the determined sets of available wavelengths.

7. An optical network node for implementing the method according to claim 1, the node comprising management means for:
   receiving at least one message containing parameters values collected along a candidate spatial route connecting the starting node to the node; and
   using an optimization method to process the collected parameters values to select a spectral route by selecting the wavelength to be used, or the wavelengths to be used successively, and connect the starting node to the optical network node.

8. The optical network node according to claim 7, wherein the method further comprises:
   determining sets of wavelengths available along the spatial route segments, from the starting node to the destination node, wherein the values of the collected parameters include identifications of the determined sets of available wavelengths.

9. The optical network node according to claim 8, wherein the method further comprises:
   selecting the spectral route as a transparent route which uses the same wavelength from the starting node to the destination node and lacks optical to electrical to optical conversion.

10. The optical network node according to claim 8, wherein the method further comprises:
    selecting the spectral route as a combination of transparent sub-paths which spectrally connect one node to another node, wherein each transparent sub-path uses the same wavelength from the one node to the another node and lacks optical to electrical to optical conversion.

11. The method according to claim 1, further comprising:
determining sets of wavelengths available along the spatial route segments, from the starting node to the destination node, wherein the values of the collected parameters include identifications of the determined sets of available wavelengths.

12. The method according to claim 11, further comprising:
selecting the spectral route as a transparent route, which uses the same wavelength from the starting node to the destination node and lacks optical to electrical to optical conversion.

13. The method according to claim 11, further comprising:
selecting the spectral route as a combination of transparent sub-paths which spectrally connect one node to another node, wherein each transparent sub-path uses the same wavelength from the one node to the another node and lacks optical to electrical to optical conversion.

14. The method according to claim 1, wherein using the optimization method comprises:
processing the values of the optical transparency parameters, collected in the received message;
minimizing a cost function based on the processed values of the optical transparency parameters; and
determining a shortest spectral route including an optically transparent path from the source node to the destination node.

15. The method according to claim 14, wherein minimizing the cost function comprises:
using a Dijkstra's algorithm.

16. The method according to claim 14, wherein the optically transparent path does not lie through opto-electronic and electronic-optical interfaces.

17. The method according to claim 1, wherein using the optimization method comprises:
processing the values of the optical transparency parameters, collected in the received message;
determining a presence of an optically transparent path from the source node to the destination node; and
one of:
informing the source node of the determined optically transparent path, and
determining an optimal path between the source node and the destination node, which optimal path includes the least possible points of non-transparency and informing the source node of the determined optimal path.

* * * * *

UNITED STATES PATENT AND TRADEMARK OFFICE
CERTIFICATE OF CORRECTION

PATENT NO. : 7,664,029 B2  
APPLICATION NO. : 10/505214  
DATED : February 16, 2010  
INVENTOR(S) : Vigoureux et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this

Twenty-eighth Day of December, 2010

David J. Kappos  
*Director of the United States Patent and Trademark Office*